O. M. STUVE.
PACKING.
APPLICATION FILED AUG. 19, 1914.
1,206,940.
Patented Dec. 5, 1916.
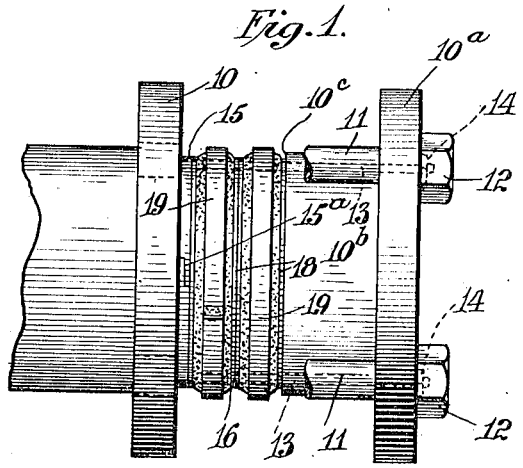
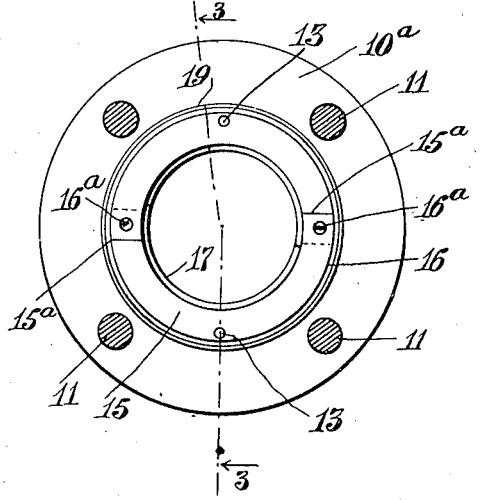
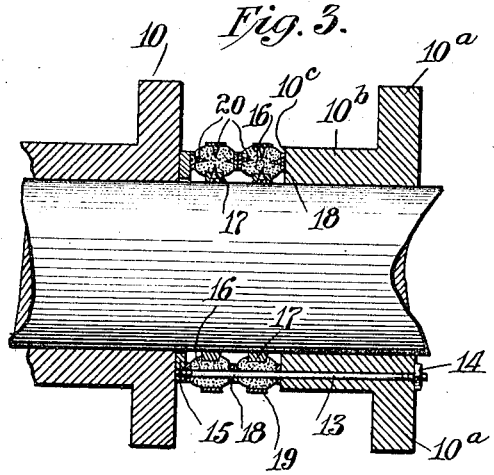
Inventor:
Ole M. Stuve
by
his Atty

UNITED STATES PATENT OFFICE.

OLE M. STUVE, OF BROOKLYN, NEW YORK.

PACKING.

1,206,940.  Specification of Letters Patent.  Patented Dec. 5, 1916.

Application filed August 19, 1914. Serial No. 857,450.

*To all whom it may concern:*

Be it known that I, OLE M. STUVE, a citizen of the United States of America, residing at Brooklyn, New York, have invented certain new and useful Improvements in Packing, of which the following is a specification.

My invention relates to improvements in packing for piston rods and analogous objects. The principal purpose of my invention is to provide a fluid tight packing, so constructed as to be expansible at the points of contact with the piston rod or plunger, but to be inexpansible at other points. In this manner I am enabled to prevent all escape of fluid while avoiding the creation of excessive friction between the moving piston, piston rod or plunger, and its packing.

In the embodiment at present preferred by me, the invention includes one or more packing elements or rings, preferably formed of sections, and comprising a body of fibrous material, held in or secured to a metallic framework. That portion of the metallic framework which is designed to contact with the piston rod is made of an expansible metal, such as nickel, while the rest of the framework may be of brass.

The invention is illustratively exemplified in the accompanying drawing, wherein—

Figure 1 is an elevational view of my improved packing; Fig. 2 is an end view thereof; Fig. 3 is a cross sectional view, partly in elevation, substantially on the line 3—3 of Fig. 2; and Fig. 4 is a detail perspective view, partly in section of parts of several packing rings or elements.

In the drawing, 10 denotes the neck bushing of a cylinder, and $10^b$ denotes a gland, between which members the packing proper is clamped more or less tightly by means of the bolts 11 and nuts 12. The neck bushing and gland are of usual or ordinary construction and require no further description.

Extending through the gland $10^b$ are a plurality of rods 13, preferably of brass or nickel and arranged diametrically opposite each other. At one of their ends, the rods extend beyond the flange $10^a$ of the gland and are threaded to receive the nuts 14. At their opposite ends, the rods 13 rigidly carry a collar or ring 15, which is split or sectional, and has rabbet joints $15^a$, each united by means of a screw $16^a$ or similar securing means. The collar 15 is carried by the rods 13 beyond the sleeve end $10^c$ of the gland, a distance sufficient to allow of interposing any desired number of packing rings, about to be described, between the collar 15 and such sleeve end.

The packing rings, which are preferably split and consist of like halves, comprise each a tightly compacted body portion 16, of fibrous material such as asbestos, and a metallic frame or support which includes the inner ring member 17, the upper and lower ring members 18, and the outer ring member 19. The inner ring members 17, which are adapted to contact with the moving member to be packed, such as a piston rod, preferably consist of a fairly expansible metal, such as nickel, while the members 18 and 19 preferably consist of brass. Owing to the presence of the fibrous asbestos body 16 there will be no appreciable heat reach the members 18 and 19, and they will consequently not be subject to expansion. All the metallic members 17, 18 and 19, are firmly attached to the asbestos body 16, by means of screws 20, or the like, arranged at intervals and passing through the metal rings into the asbestos body portion 16.

One of the packing rings, for example, that designated X in Fig. 4, is pierced by the rods 13, while the other rings are free, and have their contiguous ends grooved or undercut, as at Y, to snugly engage the peripheries of the rods 13. The packing rings are arranged to break joints, i. e. the contiguous ends of the sections of one ring will be staggered with relation to the contiguous ends of the sections of an adjacent ring. This clearly appears in Fig. 4, in which the lower ring X has the rod 13 passing centrally through one of its halves, while the ring superimposed on X has its contiguous ends meeting at the rod 13 over an intact part of the ring X. It will be understood that I may employ any desired number of packing rings, and that more than one such ring may be pierced by the rods 13, should this be found desirable.

Obviously a packing of this kind may be quickly assembled and disassembled, and may be readily adapted for use in different installations by merely adding or taking away packing rings. After a greater or less number of rings have been placed in position between the collar 15 and the end 10ᶜ of the gland 10ᵇ, the nuts 14 are tightened, whereby the packing rings are clamped in position. Thereafter the gland with the packing rings supported thereby is attached to the neck bushing 10 by means of the bolts 11 and nuts 12. When the packing is to be disassembled, as for the insertion of new rings or for any other purpose, the nuts 12 are loosened so that the gland 10ᵇ may be removed from the bushing, permitting the removal of the packing as an entity, and then the nuts 14 are loosened by which the rings are freed from compression and may be removed, and others inserted.

I claim:—

1. A packing for the purpose specified, comprising a body of compacted fibrous material, an expansible metal member secured to the inner face of said body and presenting a continuous surface to the article to be packed, and additional metal members secured to the outer faces of said body.

2. A packing for the purpose specified, comprising an annular body of compacted asbestos, a nickel ring secured to the inner periphery of said body, and brass rings secured, respectively, to the outer periphery and to the top and bottom faces of said body.

3. A packing for the purpose specified, comprising the neck bushing of a cylinder and an oppositely disposed gland, packing rings therebetween, each said packing ring consisting of a compacted body of fibrous material and a metallic framework to which said body is secured said framework presenting a continuous metallic surface to the article to be packed, and means for securing said packing rings between said gland and said bushing.

4. A packing for the purpose specified, comprising the neck bushing of a cylinder and an oppositely disposed gland, rods secured to said gland, sectional packing rings between said gland and said neck bushing, certain of said packing rings being held by said rods and others of said packing rings having the contiguous ends of their sections grooved and taking against the peripheries of said rods, and means for securing said packing rings between said gland and said neck bushing.

5. A packing for the purpose specified, comprising the neck bushing of a cylinder and an oppositely disposed gland, rods passing through said gland, an annular collar carried at one of the ends of said rods, sectional packing rings abutting said collar at one end and said gland at the other end, certain of said rings being held by said rods and others of said rings having the contiguous ends of their sections grooved and taking against the peripheries of said rods, said packing rings being arranged to break joints, means for adjustably securing said rods to the gland and means for securing the gland to the neck bushing.

In testimony whereof I have affixed my signature in presence of two witnesses.

OLE M. STUVE.

Witnesses:
OTTO MUNK,
F. T. WENTWORTH.